(12) United States Patent
Pineau et al.

(10) Patent No.: US 8,854,177 B2
(45) Date of Patent: Oct. 7, 2014

(54) SYSTEM, METHOD AND DATABASE FOR MANAGING PERMISSIONS TO USE PHYSICAL DEVICES AND LOGICAL ASSETS

(75) Inventors: Stephen Pineau, Richmond (CA); David Lee, Burnaby (CA)

(73) Assignee: Viscount Security Systems Inc., Burnaby (CA)

( * ) Notice: Subject to any disclaimer, the term of this patent is extended or adjusted under 35 U.S.C. 154(b) by 366 days.

(21) Appl. No.: 13/215,211

(22) Filed: Aug. 22, 2011

(65) Prior Publication Data

US 2012/0159579 A1 Jun. 21, 2012

Related U.S. Application Data

(63) Continuation-in-part of application No. 12/958,780, filed on Dec. 2, 2010.

(51) Int. Cl.
| | | |
|---|---|---|
| *G05B 19/00* | (2006.01) | |
| *G07C 9/00* | (2006.01) | |
| *G06F 21/60* | (2013.01) | |
| *H04L 29/06* | (2006.01) | |
| *G06F 21/62* | (2013.01) | |
| *G08B 25/14* | (2006.01) | |

(52) U.S. Cl.
CPC .......... *G07C 9/00166* (2013.01); *G06F 21/604* (2013.01); *H04L 63/083* (2013.01); *G08B 25/14* (2013.01); *G06F 21/6218* (2013.01); *G07C 9/00007* (2013.01); *H04L 63/101* (2013.01)
USPC .................................. 340/5.2; 726/62; 726/6

(58) Field of Classification Search
CPC .................................................. G07C 9/00007
USPC .......... 340/5.6, 5.2, 5.8, 5.82, 5.85, 5.74, 512; 235/384
See application file for complete search history.

(56) References Cited

U.S. PATENT DOCUMENTS

| | | | |
|---|---|---|---|
| 6,157,943 | A | 12/2000 | Meyer |
| 6,236,996 | B1 * | 5/2001 | Bapat et al. ........................ 1/1 |
| 6,363,422 | B1 | 3/2002 | Hunter et al. |
| 6,374,296 | B1 | 4/2002 | Lim et al. |
| 6,570,498 | B1 | 5/2003 | Frost et al. |
| 6,628,663 | B1 | 9/2003 | Cromer et al. |
| 6,965,294 | B1 | 11/2005 | Elliott et al. |
| 7,024,256 | B2 | 4/2006 | Krzyzanowski et al. |
| 7,330,878 | B2 | 2/2008 | Slavin et al. |
| 7,349,761 | B1 | 3/2008 | Cruse |
| 7,411,490 | B2 | 8/2008 | Perkinson et al. |
| 7,734,572 | B2 | 6/2010 | Wiemeyer et al. |
| 7,847,675 | B1 | 12/2010 | Thyen et al. |
| 2006/0136558 | A1 | 6/2006 | Sheehan et al. |
| 2007/0094716 | A1 * | 4/2007 | Farino et al. ...................... 726/5 |
| 2008/0028436 | A1 * | 1/2008 | Hannel et al. ..................... 726/1 |
| 2008/0109883 | A1 | 5/2008 | Hernoud et al. |
| 2010/0280636 | A1 | 11/2010 | Holland et al. |
| 2011/0314515 | A1 | 12/2011 | Hernoud et al. |

FOREIGN PATENT DOCUMENTS

WO          0152478          7/2001

* cited by examiner

*Primary Examiner* — Daniel Wu
*Assistant Examiner* — Frederick Ott
(74) *Attorney, Agent, or Firm* — John R. Flanagan

(57) ABSTRACT

A system and method for storing user permissions for multiple disparate physical devices and systems in a unified permissions database connected to a network in common with the devices. The permissions database also stores user permissions for logical assets on or attached to the network.

11 Claims, 7 Drawing Sheets

SYSTEM, METHOD AND DATABASE FOR MANAGING PERMISSIONS TO USE PHYSICAL DEVICES AND LOGICAL ASSETS

This application is a continuation-in-part of and claims the benefit of U.S. patent application Ser. No. 12/958,780, filed Dec. 2, 2010. The disclosure of said application is hereby incorporated herein by reference thereto.

TECHNICAL FIELD

The present invention generally relates to the field of managing permissions for physical devices and, more particularly, is concerned with a system, method and database for controlling and managing access to and/or use of physical devices and logical assets.

BACKGROUND

Many security devices and other physical devices and systems need passwords, key codes, biometric data or other inputs to allow a user to control or access such a device or system. Such devices and systems often have a local control panel or proprietary control software that is run on a local computer or web server. Some devices may be IP devices that connect to an Ethernet or the Internet, and others that communicate using the RS-485 standard may be connected to the Internet via a gateway or bridge which converts the data between the RS-485 and TCP/IP formats. Each device or system has its own hardware or software control interface. As a result of the disparate control means and separate methods for granting permissions, it is often inconvenient for a user or administrator to access, program and control each security device or system efficiently. Furthermore, self-contained, on-site security systems or devices can be compromised or malfunction without being able to issue notification to an interested party. Also, it is onerous for an administrator or building manager to set and change the permissions.

Referring to the prior art shown in FIG. 1, physical devices 1, 2 may be locally connected to and managed by a control panel 4 or dedicated computer 6. Permissions P1 and P2 for the users allowed access to each device are stored in local databases 5, 7 within or connected to the control panel 4 or dedicated computer 6. The control panel 4 and/or the dedicated computer 6 may be connected to an Ethernet or the Internet 8, allowing users to optionally access the databases and devices via a personal or other computer terminal 9.

The current convergence of technologies may mean that multiple different devices and systems may be connected to and operated from the same computer 9 or network 8. A user of such a computer, however, faces the problem that each device or system needs to be accessed separately, each with its own software interface, name/password combination and method for managing permissions. Furthermore, existing IT security systems are considered to be much more secure than physical security systems.

In the field of computer networks, systems exist for managing access to network resources such as computers, printers files etc. Such a system may be, for example, an Active Directory as provided by Microsoft. An Active Directory is a central location for network administration. It provides access to objects representing all network users, computing devices, and resources and the ability to group objects together to facilitate management and permission setting. For example, a single sign-on allows users access to many network resources. A user's name and password combination may form a user identity, which is valid throughout the network, which might span a building, a city, or several sites across the world.

SUMMARY OF INVENTION

The present invention is directed to a remote, computer-based system that provides a common interface for accessing, controlling and managing multiple different types of physical devices via the Internet. Passwords and permissions for the physical devices are stored remotely, in a common location, and all decisions as to whether a user may control a particular device are made in the remote location. Anything which is a physical IP device and has associated password security may be connected to the system, which may also manage traditional logical assets, thereby merging the physical and logical password security management functions into a unified permissions management system.

Users of the system may be defined as members of groups, and groups may be assigned access to the areas and/or the physical devices within the areas of a facility. By assigning a user to a group, that user is automatically granted access to the area or devices for which the group has permission. A user may be a member of more than one group. Likewise, access may be granted in a similar way to logical assets, using the same or different groups.

Disclosed herein is a system for managing permissions comprising: one or more physical devices each requiring users thereof to be granted permission before use thereof; a network to which each of the physical devices is operably connected; a computer connected to the network; and a database accessible by said computer, said database storing identifications of users correlated with identifications of physical devices to which the users have been granted permission; wherein, when identification of a user is presented to a physical device, use thereof is permitted if the computer determines by accessing the database that permission has been granted for said user to use said physical device.

In another aspect, the present invention is directed to a system for managing permissions comprising: one or more physical devices each requiring users thereof to be granted permission before use thereof; a network to which each of the physical devices is operably connected; a computer connected to the network; and a database accessible by said computer, said database storing identifications of users correlated with identifications of physical devices to which the users have been granted permission; wherein when identification and authentication of a user is received at the computer, from said user, use of the physical devices to which said user has been granted permission is permitted without said user providing further authentication.

In a further aspect, the present invention is directed to a unified permissions database comprising one or more non-transitory computer readable media configured to store: identifications of users; authentications of said users; definitions of groups; records of said groups to which said users belong; identifications of physical devices; definitions of zones, each of which comprise one or more said physical devices; and permissions of certain of said groups to certain of said zones; thereby relating identifications of one or more users with identifications of one or more physical devices to which said users have been granted permission.

Further disclosed is a method for permitting use of physical devices, comprising the computer-implemented steps of: storing details of: users; physical devices; zones comprising physical devices; groups comprising users; and permissions of groups to zones; receiving an identification of a user;

authenticating said user; receiving an identification of a physical device that said user wishes to use; determining a zone in which said physical device is located; determining a group in which said user is a member; determining whether said group has permission for said zone; and if said group has permission, permitting said user to use said physical device.

BRIEF DESCRIPTION OF DRAWINGS

The drawings illustrate embodiments of the invention, but should not be construed as restricting the scope of the invention in any way.

DETAILED DESCRIPTION

Figure 1:
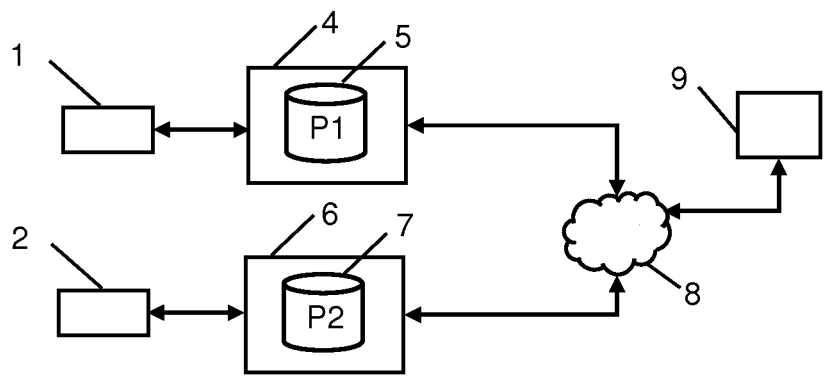
FIG. 1 is a schematic diagram of the prior art.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware and software is not always sharp, it being understood by those skilled in the art that software implemented processes may be embodied in hardware, firmware, or software, in the form of coded instructions such as in microcode and/or in stored programming instructions.

Physical Devices

There are many devices and systems that may be managed and controlled by the present invention. For example, intrusion devices may be connected such as alarm keypads. Such an alarm keypad may operate over an RS-485 connection that is converted to a TCP/IP protocol for transmission over the Internet, or it may be an IP alarm keypad. Other devices may include burglar alarms, fire alarms, IP fire alarms, card readers, RFID entry devices, biometric entry devices, intercoms, IP voice devices and CCTV cameras. Combination devices may also be managed, such as an IP camera-intercom system or an IP camera-microphone-keypad-reader system.

Non-security devices may also be managed by the system, and may include, for example, HVAC and other building management components and devices, such as lights, daylight sensors, light level sensors, temperature sensors, heating appliances, air conditioning systems, humidity detectors, automated blind controls, occupancy sensors and smoke sensors. Also included may be IP Programmable Logic Controllers, nurse call devices, any kind of SCADA device and batch systems etc. While these are not security devices, they may well require passwords and permissions to be granted in order for users to use them. In fact, any kind of managed device that has an IP address or may be allocated an IP address may be incorporated in the system.

Devices such as cars, forklift trucks, buses, cranes, diggers, workshop machinery, laboratory equipment, furnaces, production lines, public announcement systems, showers, microwaves, electric bikes and any other vehicle, machine or piece of equipment are further examples of physical devices that may be provided with an IP address and linked to the system such that access to them is granted by a user's logging on to a central permissions directory with a single password. Such physically detached devices may be connected to the system using known wireless connection and communication methods.

Areas

Physical devices may be grouped into areas, or zones, which may require different levels of control. Examples of controlled areas are the reception area of a building, the office area, the storeroom, etc.

Groups

Users may be grouped together in groups such as employees, managers, security personnel, etc. Some of these groups may be aligned with job function or department, but equally they may be independent. Whereas a user is generally in only one department, a user may be a member of more than one group.

Logical Assets

These assets generally include computing devices such as desktop computers, servers, laptops, electronic or optical storage devices, printers and electronic assets such as files and other electronic data. Logical assets include devices that are usually found in a computer network, such as LAN or a WAN.

Mass Notification Systems

Mass notification systems, such as systems for bulk emailing, bulk texting, sending tweets or posting on social networks; or public address loudspeaker systems, etc. may also by included as devices in the overall system. Permissions to access mass notification systems, and thereby send out messages to a multitude of people at once, may be included in the permissions database. Such a system may be useful for informing users of emergency situations, and well as for general provision of information. A mass notification system may be a logical or physical device or system.

Control and Monitoring Computer (CMC)

The CMC provides a unified platform through which the physical devices may be controlled. It also includes or has access to a database of all the users, IDs, passwords, permission levels, policies, etc for all the physical devices connected to the system. The database may be embodied in an Active Directory by Microsoft, for example. The database contains all the details which permit the CMC to determine whether or not to allow access to a particular user to manage or control a physical device. The use of such a central database eliminates the need to store a different set of user IDs and permissions in each individual device or system. In a security system for a building, for example, the CMC may permit employee access management, visitor management and Facility Friend™ Management as provided by Viscount Communication and Control Systems Inc. (the assignee of the present invention). Rules, permissions and policies for multiple physical devices may be assigned in groups, at the same time, resulting in efficient management within the unified physical and logical schema of the overall system. The database may be located within the CMC server or remote from it.

IP-Based Messaging Between Devices

If an alarm is triggered by one device connected to the CMC, then it is possible for the CMC to send messages to other devices connected to the network. For example, a fire alarm that is triggered may cause the CMC to send messages to door lock devices instructing them to unlock.

Cameras that are connected to the system may include software for interpreting the images detected by the camera. For example, if image analysis suggests that there is an intruder, other cameras may be instructed to pan/tilt towards the suspected intruder, and additional lighting connected to the network may be switched on. A signal sent to the CMC may result in the CMC sending an alert to a security guard monitoring the cameras or premises.

In some configurations, devices may be enabled to send messages directly to each other.

Encryption

Some physical devices may encrypt data before transmitting it. For example, door entry readers, in addition to transmitting Wiegand data pulses, may also have the capability to send encrypted data on separate RS-485 (or equivalent) data lines. In the latter case, a bridge would take the encrypted data stream then put that data stream into its TCP encrypted packets. At the receiving end, in the CMC, the TCP packet would be decrypted with the bridge keys to reveal the reader-encrypted data, which would in turn be decrypted with the reader key stored in the CMC, database or active directory. Such readers or other devices that perform encryption may transmit only on RS-485 data lines, on RS-458 and other lines, or on other lines only. It may also possible for readers to scramble or encrypt the streams of Wiegand pulses using one or more encryption algorithms. Whether the signal to be transferred to the CMC is encrypted or not is irrelevant to the bridge, as it transmits whatever data it receives transparently. In an alternate configuration, the bridge may be configured to convert the encrypted RS-485 signal to TCP/IP, without having a separate channel for converting Wiegand pulses. Other transmission formats besides RS-485 may also be converted.

Unified Permissions System Overview

Figure 2:
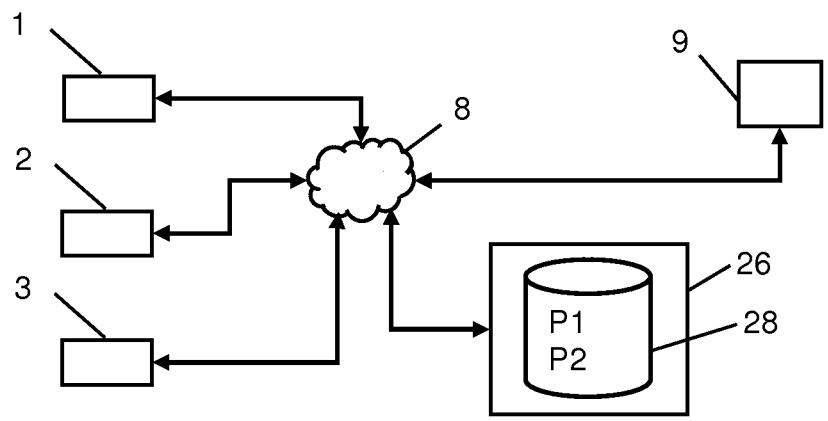
FIG. 2 is a schematic diagram of an overview of the unified permissions system.

Referring to FIG. 2, a schematic diagram of the permissions system is shown. Physical devices 1, 2 connect to an Ethernet or the Internet 8 without an intervening control panel or dedicated computer. Note that the connection may be made via an intervening bridge or gateway. Permissions P1 and P2 for users of the physical devices are stored in a CMC 26 or other computer comprising a permissions database or directory 28. The permissions database 28 is unified, in that it may also be used for storing permissions for users to access logical assets and resources 3. Permissions P1 and P2 may represent individual permissions or group permissions. A permission may be limited by the day or days of the week, the time of the day or by some other rule. The database 28 may be accessed by use of computer 9 via the Ethernet or the Internet 8.

Example of a Bridge

A bridge acts transparently to convey remote information, such as digital inputs or Wiegand reader inputs, to a CMC. One such CMC may be a MESH Server provided by Viscount Communication and Control Systems Inc. The CMC controls all decisions regarding what is to be done with the conveyed digital inputs or Wiegand card inputs, and when such decisions are made, the CMC conveys the commands back to the bridge, via the Internet, for execution by functional devices, namely, output devices such as operating annunciators and access devices, such as door strikes. The term "functional devices" is meant in a generic sense to cover all devices serving or performing single or multiple functionalities (functions or actions), including but not limited to security functions.

Significantly, the bridge does not make any decisions about the data it is obtaining from its input sources. The bridge simply passes on the data to a CMC, which makes all the decisions then sends commands back to the bridge, telling the bridge what functional devices need to be activated. By such transparency and bridging operation, the bridge is not restricted from future expansion in terms of longer data streams and faster device protocols.

The Internet facilitates the conveyance of information to and from the bridge. The information conveyed, in both directions, is packaged in a format suitable for transfer via the Internet Protocol (IP) foundation using the Transmission Control Protocol (TCP) known as the TCP/IP protocol suite. The TCP/IP protocol suite has been chosen for the conveyance of the packaged data, in both directions, because of its reliability to deliver data packets to the intended destination. Furthermore, as an example, the TELNET protocol, which runs on top of IP, provides for terminal-like operation so that the CMC may be configured to communicate with serial RS-485 devices connected to the bridge. The use of the TELNET protocol is optional, as is the use of any other protocol which may run on top of IP.

Bridges with different numbers of channels may form an Internet-ready product family. For example, the bridge may be a single-channel unit, a dual-channel unit, a quad-channel unit, etc., each of which provides the appropriate hardware to connect various functional devices, such as digital contact inputs and Wiegand-compliant card readers at one end, via the Internet, to a customer's control and monitor computer (CMC) at the other end. In essence, the bridge may make a connection between dissimilar technologies such as the Internet at the one end and discrete functional devices at the other end. The bridge is not limited to only Wiegand-compliant card readers, as it may be adapted as required to any input or output source.

Figure 3:
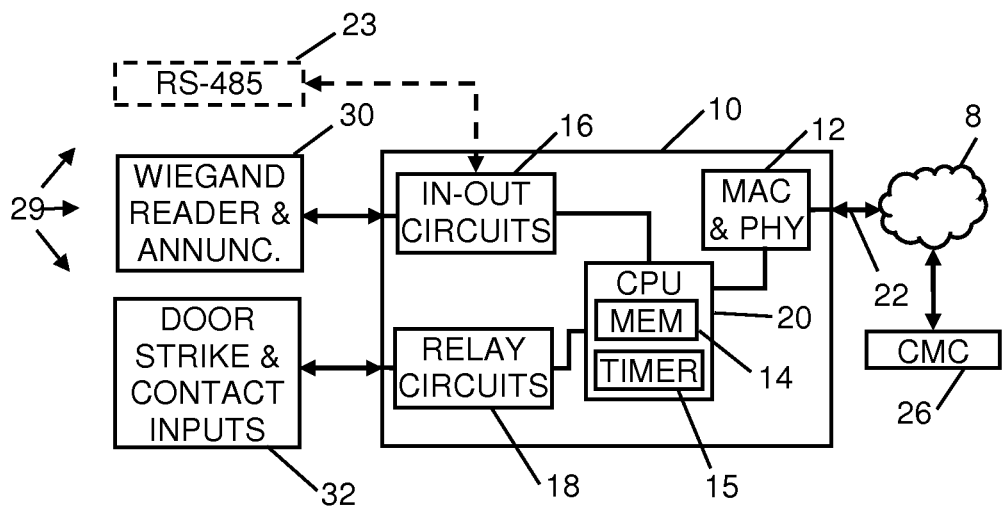
FIG. 3 is a block diagram of an exemplary embodiment of a bridge for interfacing various functional devices for facility access with a network for control.

Referring to FIG. 3, there is illustrated an exemplary embodiment of a bridge 10 that is typically deployed at a location such as near an entrance to a building. The bridge 10 is connected by a communications link for example an Ethernet 22, via a network for example the Internet 8, to a CMC 26 which may be a server, for example. Depending on the type of network 8, the bridge 10 may be located in the same building as the CMC 26, but remote from it, or it may be in a different building.

For connection to the network 8, the bridge 10 has Media Access Controller (MAC) and Physical Timing Generator (PHY) circuits 12. The MAC is an electronic Integrated Circuit with circuits to implement an interface between one or more programs running in the central processing unit (CPU)

20, and the buffering of data packets required for Internet operation. The PHY is an electronic Integrated Circuit with circuits to create the high-speed serial bit-timing for putting the packet data onto the Ethernet 22 for transport via the Internet 8. The PHY contains the circuits to connect to the Ethernet 22, so the PHY is the doorway for input and output. The CPU 20 may have internal memory (MEM) 14 for storing the programs and other information during operation. In the past, the CPU 20 and memory 14 would be separate Integrated Circuits, but today, they are typically combined into one larger CPU Integrated Circuit. Memory 14 may be of different types, such as volatile and non-volatile, and it may be distributed partially within the CPU 20 and partially external to it. Typically, a CPU, MAC, and PHY may be three separate Integrated Circuits. Alternately, the CPU 20 and MAC may be combined together in one Integrated Circuit, with an external PHY. Most recent improvements have all three of the CPU, MAC and PHY in the same Integrated Circuit. It does not matter which of these or even other alternatives is used as they all perform the same function. A MAC address may be stored in a non-volatile memory 14.

The bridge 10 includes various input-output circuits 16 that connect to various functional devices 29, namely input and/or output devices 30, such as Wiegand-compliant devices, which may be card readers and visible and/or audible annunciators. Input devices 30 may also include open/close sensors for detecting whether a door is open or closed. The bridge 10 also includes various relay, and input status circuits 18 that connect to various other functional devices 29, namely door strikes and digital contacts 32. There may be one or more of the functional devices 29 of the same or different kind connected to the bridge 10.

In the specific case of digital inputs, such as on/off status inputs, the bridge 10 is not limited to any pre-programmed interpretation as to the functionality of the digital inputs, such as "tamper detected", "request to exit", etc. but instead provides dynamic capability to adapt to future functionality because the digital input data is bridged transparently to the CMC 26 for analysis and processing.

Functional devices 29 such as annunciators and also door strikes may be classed as output devices, and any other output device that needs to be controlled may be connected. For example, an RS-485 serial device 23 may be connected to the in-out circuits 16 of the bridge 10 instead of or as well as input-output device 30. The RS-485 serial device may be virtually connected to the CMC 26 via the Internet 8 using the TELNET protocol, for example, so that the CMC 26 could talk to the RS-485 device in parallel with a card-access function of the bridge 10. The bridge 10 is not limited to any pre-programmed interpretation as to the functionality of the digital outputs, such as "open first door", "open second door", etc. but instead provides dynamic capability to adapt to future functionality because the digital output data is passed transparently from the CMC 26 to the output devices. The bridge 10 is not limited to any pre-programmed RS-485 protocol but instead provides a transparent virtual conduit to allow the CMC 26 to remotely communicate with a RS-485 serial device 23, if connected, via the Internet 8.

Various processes may occur in the bridge 10 as the CPU 20 reads computer readable instructions that are stored in the memory 14 located within the CPU Integrated Circuit 20 or outside it in a separate Integrated Circuit. The instructions may be written in C-Language then compiled into machine-readable code, for example. One or more of the various processes may be started, for example, by an interrupt service request that is triggered by the hardware of circuits 16 and 18 in the bridge 10 detecting an input.

Specific hardware timer circuits 15 within the CPU 20 operate independently of the programmed-operation by the firmware within the CPU 20, and when said hardware timer circuits 15 expire, an interrupt service request may be generated to process the timer-expiry event.

The bridge 10 may be powered by a 12 Vdc power supply, but other power supplies may also be used, for example, Power over Ethernet (PoE).

The CMC 26 includes a processor and computer readable instructions stored in a digital memory for interpreting communications from the bridge 10 and preparing messages to be sent back to the bridge 10. Such instructions may be written in JAVA, for example, but the use of other programming languages is also possible.

The latency or delay time associated with conveying the data packets between the bridge 10 and the CMC 26 is acceptable due to the usually small amount of data that needs to be transmitted at a single time, and latency in the sub-second range is typical. However, as the amount of data increases, it is likely that faster protocols will be used, which the bridge 10 would be able to accommodate.

The CMC 26 may be configured to log all attempts to enter that are communicated to it via the bridge 10, or it may include or be connected to a logging server that performs this function.

For redundancy, communications to a second CMC, as a backup, may be provided by the bridge 10. A customer may develop his own CMC to communicate with the bridge 10, provided communications are compatible with the data package structure and formatting of the bridge 10. The customer is therefore not restricted to purchasing a CMC from the same vendor as for the bridge 10.

The bridge 10 has a relay output for sending RELAY signals from the circuits 18 to the door strike 32, which may be operated by a relay. The bridge 10 is also configured to receive a door input DOOR signal, which is a signal from another functional device 29 in the form of a sensor that indicates whether a door is open or closed. The bridge 10 is also configured to receive a request to exit (REX) signal, which may originate from another functional device 29 in the form of a push button located near the door through which exit is desired. The bridge 10 is configured to produce a BUZ signal for controlling a buzzer on the Wiegand device 30. The bridge 10 may also be configured to receive and produce other signals and/or signals with other formats depending on which input and output functional devices 29 are desired to be connected to the bridge 10, and which functional features are present in the Wiegand device 30.

The bridge 10 is configured to detect signals which comply with the current Wiegand Protocol, but it is also capable of detecting signals that go beyond the bounds of the existing protocol. For example, the bridge 10 may detect pulses that are more frequent and/or that are shorter than in the existing protocol, and may detect pulse streams that are any length up to 1024 bits long. While 1024 bits have been selected as being adequate for many years, depending on the design of the bridge 10, other maximums may be chosen. The bridge 10 may detect as is, or be configured to detect, signals from other protocols that create a series of pulses, on one, two or more wires, and even signals that have more than two levels on a single wire.

Detected pulses corresponding to bits are built into packets, according to the well known protocol stack for TCP/IP transmission. Conversely, when a packet is received by the bridge 10, it is stripped of its various headers and checksums as it passes through the layers of the TCP/IP protocol stack, to ultimately reveal data bits that may be used for identifying and controlling functional output devices 29, such as door strikes, buzzers, and LEDs.

Figure 4:
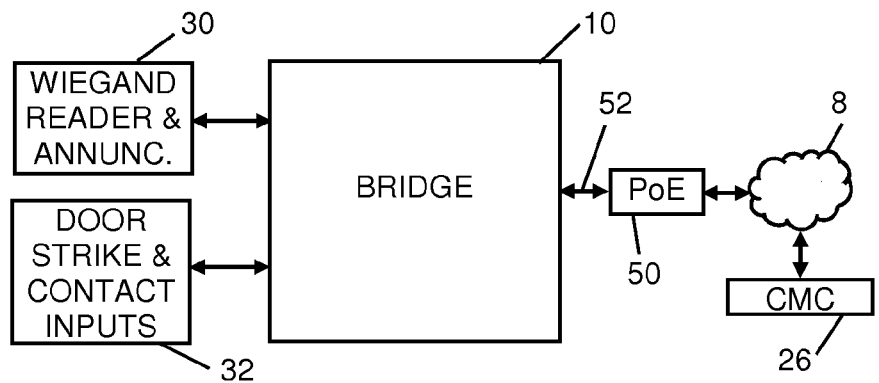
FIG. 4 is a block diagram of the bridge connected to a power over ethernet (PoE) switch.
Figure 5:
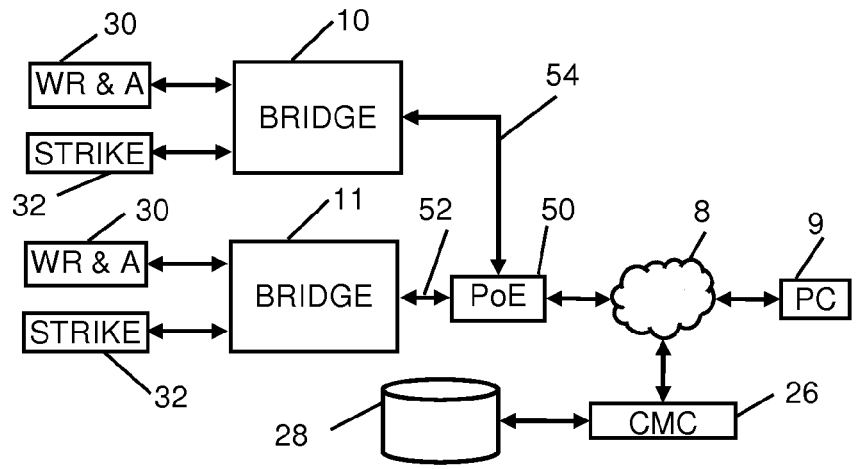
FIG. 5 shows multiple bridges connected to a power over ethernet switch.
Figure 6:
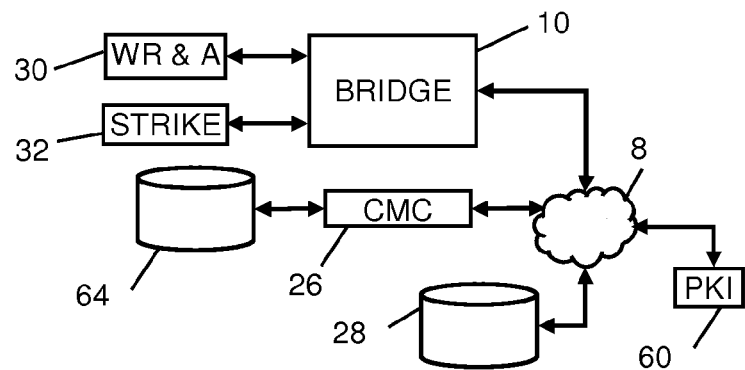
FIG. 6 shows a bridge connected via the Internet to a Public Key Infrastructure server.

There are many configurations in which the bridge 10 may be configured or connected, and the following text describes just a few or them as shown in FIGS. 4-6.

Referring first to FIG. 4, the bridge 10 may be connected to a powered Ethernet cable 52 using Power-over-Ethernet (herein 'PoE') technology. The PoE cable 52 connected to a PoE switch 50, which is an off-the-shelf device capable of providing both power and Ethernet to the bridge 10. The PoE switch is also connected to the Internet 8 as it needs to convey data packets received from PoE devices, such as bridge 10, over the Internet 8 to the appropriate destination.

In the case of a bridge 10 that communicates over a wireless communications channel 22 (FIG. 3) to the Internet, then the wireless bridge would have no PoE cable and would be powered from a local dc power supply at the bridge location. Wireless technology may be used to communicate with the Internet, via the IEEE 802.11 protocol using the most secure and latest implementation thereof. The key functionality of wireless and wired bridges 10 are the same, the difference being only the method of connecting to the Internet.

Referring to FIG. 5, if a second bridge 10 be required at the same remote location, it may be powered from its own PoE cable 54 from the PoE switch 50. Also in FIG. 5, a central permissions database 28 is shown to which the CMC 26 is connected. The database 28 contains details of users, user IDs, permissions, policies etc, which permits the CMC 26 to determine whether or not to allow access to a particular person via a particular door or portal at a particular time and/or day of the week. The use of such a central database 26 eliminates the need to store a different set of user IDs and permissions at each individual bridge 10. Other computers, such as servers, general purpose computers and/or PCs 9 may be connected to the CMC 26 via the Internet or local Ethernet 8. Access to the security program and/or database 28 may be possible via such other computers 9.

Referring to FIG. 6, there is shown another way of connecting the bridge 10 into a security system. In this configuration, the CMC 26 is connected to a local cache 64 of permissions data and the main, central database 28 is connected to the CMC 26 via the Internet 8. In this case the central database 28 may be located remotely from the premises which are to be protected. It is possible that the database 28 be located at multiple remote sites, with multiple mirrors and/or backups. The database 28 may be located in one of Microsoft's Active Directories, for example.

Also shown in FIG. 6 is a connection from the CMC 26 via the Internet 8 to a Public Key Infrastructure (PKI) server 60. The function of the PKI server is to verify whether a particular ID sensed at an input device 30 is valid or not. An extra level of security is added by separating the ID validity check from the policies and permissions check at the database cache 64 or the central database 28.

Every so often, details of personal ID cards, which have become invalid and are stored in the PKI server 60, may be transferred to the central database 28. This may allow the ID validity check to be performed at the central database 28 on data that is managed by the PKI server 60. The PKI server may store both valid IDs and invalid IDs but it may be more efficient to only store or only check for invalid IDs.

An advantage of using a central database 28 is that multiple CMOs 26 may be connected via the Internet 8 to it. Large organizations may have multiple sites, or a presence in multiple locations across the country or around the globe. Each site or group of sites or city may have its own CMC 26, and it would be more useful to have one common user ID and permissions database than to have to maintain several of them.

The identification of a user is provided to a physical device, for example by an RFID fob or card or the entry of a code, and the physical device then provides the identification to the CMC. The provision of the identification by the user may by also considered to be a command to open a door, for example. In other situations and for other physical devices, a user may provided identification and a command separately.

Exemplary Embodiments

Figure 7:
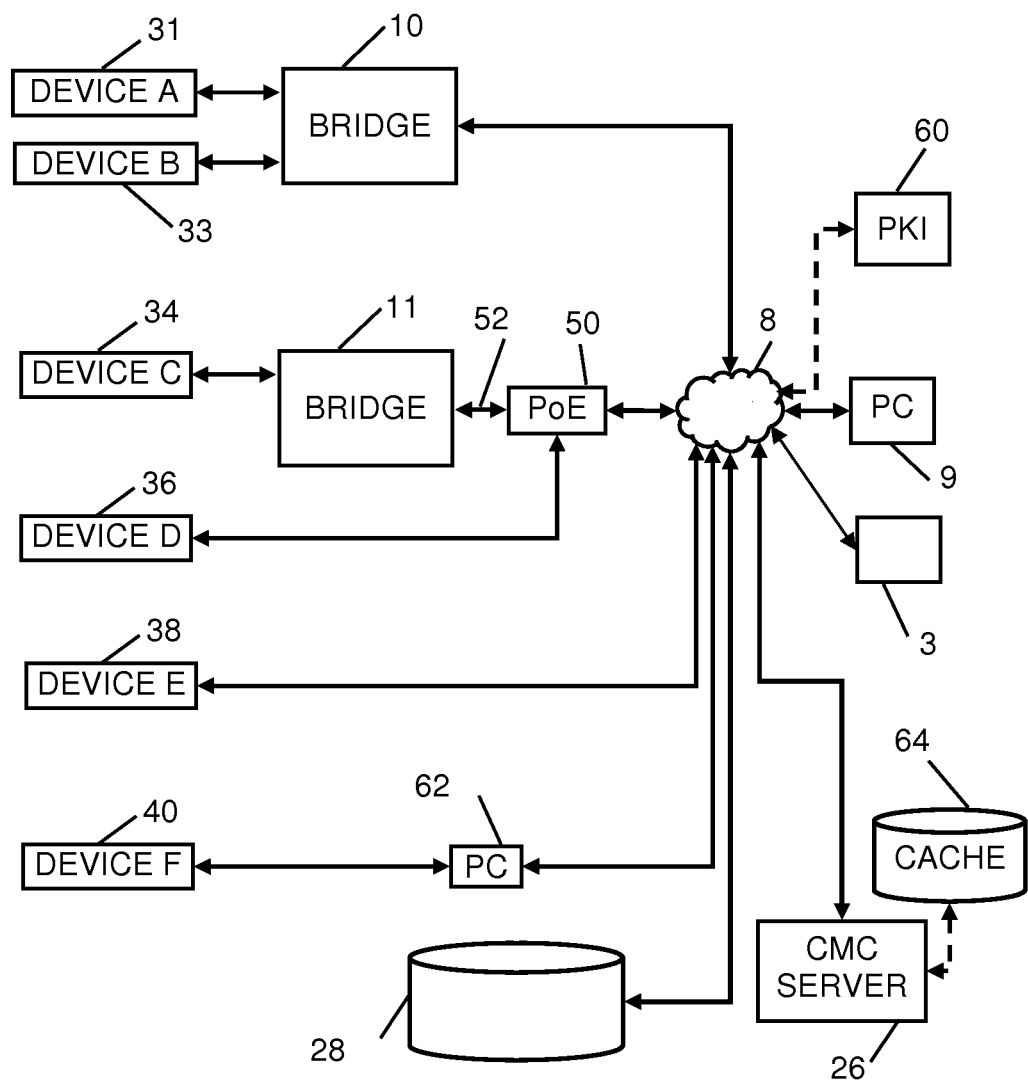
FIG. 7 is a more generalized schematic diagram of a unified permissions system showing various connection options.

Referring to FIG. 7, one or more of physical devices A-F 31, 33, 34, 36, 38, 40 and optionally further devices may be connected via the Internet 8 to the unified permissions system embodied in CMC server 26 and/or permissions database 28. A device may in fact be a group of one or more physical devices or a physical system. The devices may be IP devices or non-IP devices. If they are non-IP devices, such as Devices A-C 31, 33, 34, they may be connected to the system via a bridge 10, 11 or gateway which has its own IP address. A bridge such as bridge 10 may be powered independently or in the case of bridge 11 it may be powered from a Power Over Internet (PoE) cable 52 from a PoE switch 50. Some devices such as Device D 36 and Device E 38 may be configured to connect directly to the Internet 8, either via a PoE switch 50 in the case of Device D 36 or using an independent power source. Device F 40 may, for example, be connectable to the Ethernet or Internet 8 via a computer 62.

A central permissions database 28 is shown to which the CMC 26 is connected via the Internet 8. The permissions database 28 contains details of users, user IDs, permissions, and/or policies etc, which permits the CMC 26 to determine whether or not to allow access to a particular user to control or manage a particular device 31, 33, 34, 36, 38, 40 or access through a particular door or portal at a particular time and/or day of the week. Permissions may be granted in groups, for example, a given user may be granted permission to a group of physical devices, or a group of users may be granted permission together for a given device. The use of such a central permissions database 28 eliminates the need to store a different set of user IDs and permissions at each individual bridge 10, 11 or in the devices 36, 38, 40 themselves. Other computers, such as servers, general purpose computers, PCs, tablets, smartphones, etc. 9 may be connected to the CMC 26 via the local Ethernet or Internet 8. Access to the security program in the CMC and/or to the permissions database 28 may be possible via such other computers 9.

The CMC server may also control access to logical assets 3. These may be directories, files, software applications, printers etc. In other embodiments, the CMC server may be located on two or more servers, and if so, one may be used for logical assets and the other for physical devices.

In an optional configuration, the CMC 26 may be connected to a local cache 64 of permissions data. In this case the central permissions database 28 may be located remotely from the premises which are to be protected or which has the physical devices. It is possible that the directory 28 be located at multiple remote sites, with multiple mirrors and/or backups. The permissions database 28 may be configured using one of Microsoft's Active Directories, for example.

The computer 9 may be a wireless laptop/tablet, which may be used to access the CMC server 26 to configure the devices at installation. For example, an installer could select a connected device from a predetermined pull-down list of possible devices and verify at the location of the installed device that the selection correctly represents the installed device. The installer could operate the device and check that any signals transmitted to the CMC are as expected.

The CMC server may be able to download settings or other parameters to be used in the bridges or connected devices.

Optionally, and shown in FIG. 7, is a connection from the CMC 26 via the Internet 8 to a Public Key Infrastructure (PKI) server 60. The function of the PKI server is to verify whether a particular ID sensed at an input device, for example, or received at computer 9, is valid or not. An extra level of security is added by separating the ID validity check from the policies and permissions check at the database cache 64 or the central permissions database 28. Every so often, details of personal ID cards, which have become invalid and are stored in the PKI server 60, may be transferred to the central permissions database 28. This may allow the ID validity check to be performed at the central permissions database 28 on data that is managed by the PKI server 60. The PKI server may store both valid IDs and invalid IDs but it may be more efficient to only store or only check for invalid IDs.

Device 38, for example, may be controllable by a user operating a computer 9, for example. In this case, identification of the user is supplied via computer 9 to CMC server 26. Since access to the physical device 38 is via a computer interface, it will be usual to require users to input authentication in conjunction with identification. Such authentication may be a password, passcode, biometric data input or other means of authentication. The CMC will verify both the identification and the authentication before granting user access to the device.

Multiple CMOs 26 may be connected via the Internet 8 to the permissions database 28. Large organizations may have multiple buildings, or a presence in multiple locations across the country or around the globe. Each site or group of sites or city may have its own CMC 26, and it would be more useful to have one common user ID and permissions database than to have to maintain several of them.

In a basic embodiment, the permissions database 28 may comprise a database such as shown in Table 1. Columns contain fields that represent permissions for objects. Each object is a representation of a physical device. Rows represent entries for different users, each row indicating whether the respective user has permission or not to access each object. For example, a "Y" represents that a user has permission and an "N" represent that a user does not have permission for the respective object.

TABLE 1

|        | object 1 | object 2 | object 3 | object n |
|--------|----------|----------|----------|----------|
| user 1 | Y        | Y        | N        | N        |
| user 2 | N        | Y        | N        | N        |
| user n | Y        | N        | Y        | Y        |

A simplistic table has been shown to demonstrate the permissions database and it is recognized that a more complex database may be employed. For example, such a database may comprise multiple tables that are related to each other using known relational database languages.

In Table 2, another example of the way the data is structured in the database is shown. In this example, the columns represent memberships of different groups. For example, one group may be 'Employees', another may be 'Managers', a further group may be 'Administrators', a fourth group may be 'Security', etc.

TABLE 2

|        | group 1 | group 2 | group 3 | group n |
|--------|---------|---------|---------|---------|
| user 1 | Y       | Y       | N       | N       |
| user 2 | N       | Y       | N       | N       |
| user n | Y       | N       | Y       | Y       |

In a similar way, Table 3 shows the zones to which groups of users are allowed access. A zone may be a part of a building, for example, or devices or equipment within a building, or a zone may represent a collection of physical devices to which a group of users may collectively be granted access.

TABLE 3

|         | zone 1 | zone 2 | zone 3 | zone n |
|---------|--------|--------|--------|--------|
| group 1 | Y      | Y      | N      | N      |
| group 2 | N      | Y      | N      | N      |
| group n | Y      | N      | Y      | Y      |

Such a permissions database 28 may also contain objects that relate to computers, printers, electronic assets, network resources etc. as well as the physical objects. Each object represents a single entity or a group of entities, and its attributes. Objects may contain other objects due to the hierarchical or tree structure often employed in such directories. An object is uniquely identified by its name and has a set of attributes that are defined by a schema or set of rules. The attributes of each object may be defined using a commonly known protocol, such as the Lightweight Directory Access Protocol (LDAP).

An object may represent a part of a physical device or system, and as a result, a given physical device or system may have multiple objects. For example, a general user may have permission to adjust a thermostat by a few degrees but a building manager may have permission to turn the thermostat on and off. The adjustment and on/off functions would be represented by different objects, and these may be objects that are contained within an overall building temperature management or HVAC object.

When a user logs onto a network via a terminal he will automatically have access to the physical devices for which he has been granted permission as defined in the permissions database. There will be no need to enter a separate user name and password for each individual physical device or system that he wishes to control.

Figure 8:
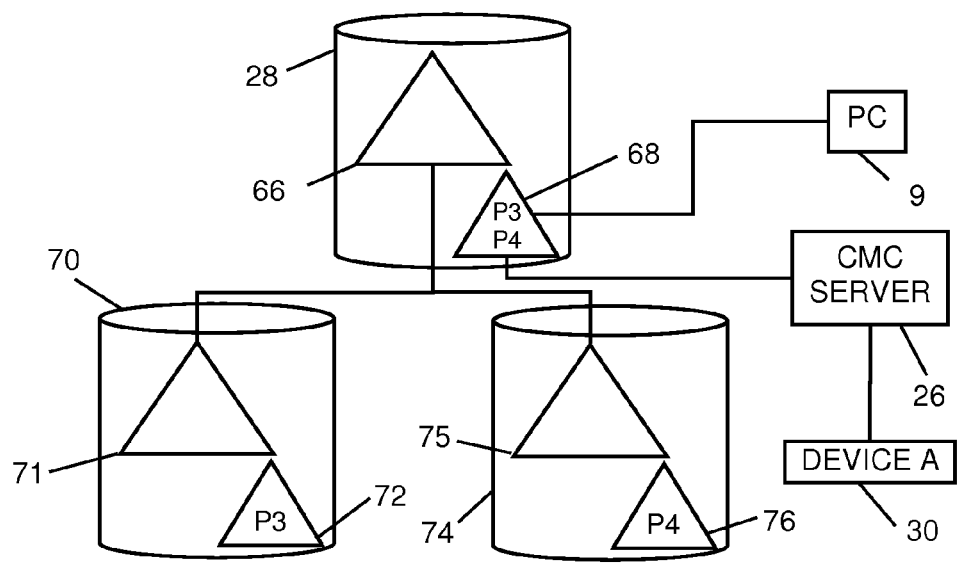
FIG. 8 is a schematic diagram of a permissions database structure.

FIG. 8 shows an example of how a permissions database 28 may be divided and replicated. For example, the permissions database 28 may comprises two smaller databases, one database 66 for logical assets and one database 68 for physical devices. This may be implemented using Microsoft's Active Directory, for example, by using a default schema and settings in database 66 for controlling access to the logical assets of an enterprise. A partition may be made using the Lightweight Directory Service (LDS) to form a physical device permissions database 68 in which the definitions of the devices, their locations and their zones are stored, as well as the user groups to which permissions have been assigned. Different group permissions may be denoted P3 and P4, for example. Membership of users in the groups may also be stored in database portion 68. The physical device permissions database 68 may use or access details of some or all of the users defined and stored in the logical permissions database 66. A benefit of separating, or at least partially separating the two databases is that is will permit different administrators to manage each one separately, if required. For example, an enterprise may have an IT administrator who is different from the physical security administrator.

The permissions database 28 may be replicated, in full or in part, to form copies in other locations. For example, permissions database 70 may include a copy 71 of the logical permissions database 66, and a partial copy 72 of the physical device permissions 68 including permissions P3 but not P4. As another example, permissions database 74 may include a copy 75 of the logical permissions database 66, and a partial copy 76 of the physical device permissions including permissions P4 but not P3. The permissions for the logical assets may also be divided up when replicating the main permissions database 28.

The permissions P3 and P4 may be accessed by an administrator using a general purpose computer 9, for example. The connection may be made through an Ethernet or the Internet, and the same computer 9 may also be used for accessing the permission for the logical assets in database portion 66. The CMC server 26, which is used for receiving signals from and sending signals to the physical devices, is also connectable to the physical permissions portion 68 of the permissions database 28. The CMC 26 in turn is connected, via a network, to physical devices such as Device A 30. In some embodiments, the CMC server 26 and the permissions database 28 may be located on the same server.

Figure 9:
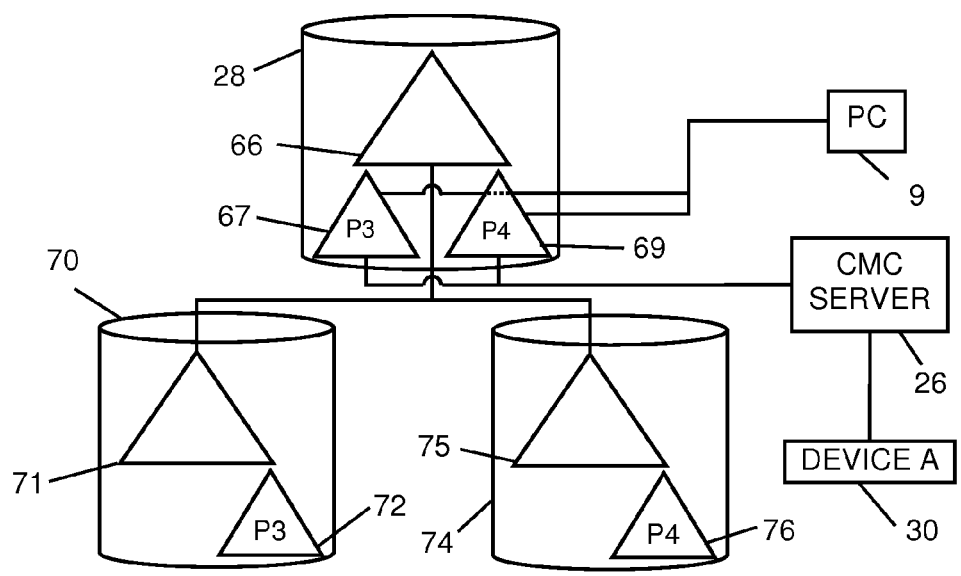
FIG. 9 is a schematic diagram of an alternate permissions database structure.

In FIG. 9 an alternate arrangement is shown that separates P3 and P4 into two instances 67, 69 of the Active Directory Application Mode/LDS. In this arrangement we can have the root domain controller host multiple instances of Active Directory Application Mode/LDS instances. The permissions P3 and P4 may be accessed by an administrator using a general purpose computer 9 connected to instances of P3 67, and P4 79. As above, the CMC server 26, which is used for receiving signals from and sending signals to the physical devices, is connected to the separated instances 67, 69 of the physical permissions portion of the permissions database 28. Replication works in pretty much the same way as in the previous arrangement, except that P3 and P4 are now separately replicated to their corresponding branches 72, 76. Each instance contains information pertaining to control areas, physical devices and access rules relevant to a specific building or geographic area. This way different areas maintain a certain level of autonomy of access control rules while sharing the centralized users and groups information as provided by the domain Active Directory 66.

A further advantage of using an existing system such as Active Directory, or any other equivalent logical security system, is that a physical device permissions database may be added to an existing set-up, without compromising the security of the IT assets.

We have given examples of embodiments in which the users are defined in the logical permissions portion 66 of the permissions database 28, and the access groups, zones and devices are defined in the portion 68 of the permissions database. However, the division may be different in other embodiments, in that one or more of the access groups, the areas and the devices may be defined in the main portion 66 of the permissions database.

Figure 10:
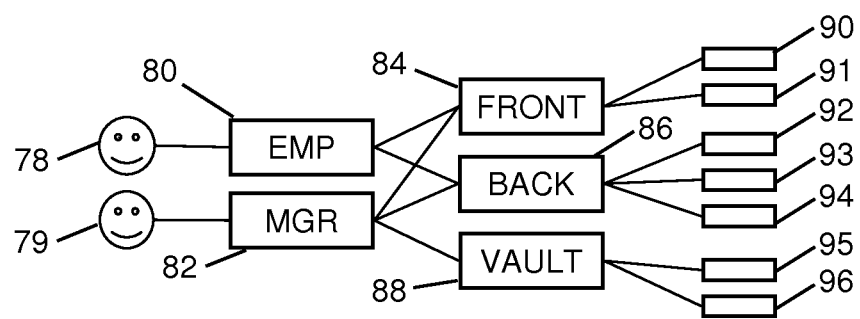
FIG. 10 is a schematic diagram showing associations of users, groups, zones and devices.

FIG. 10 shows users 78, 79 recorded as being members of Employee group 80 and Manager group 82, respectively. The Employee 80 group of users has access to the Front area 84 of a building, which may have in it physical devices 90 and 91, and Back area 86 of a building, which may include physical devices 92, 93 and 94. Such devices may be doors, for example. The Manager group 82 of users has access to the Vault zone 88 as well as the Front 84 and Back 86 areas of the building. The Vault zone may include devices such as a door 95 and a safe 96.

Figure 11:
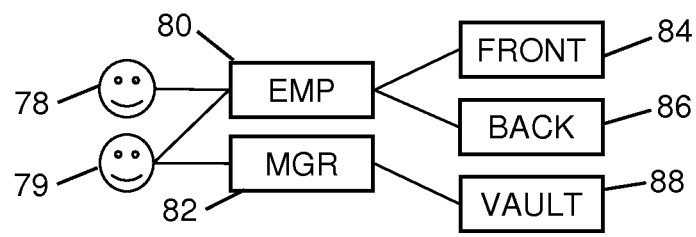
FIG. 11 is a schematic diagram of associations of users, groups and zones.

FIG. 11 shows an alternative set up, where users may belong to more than one group. In this case, user 78 is in the Employee group 80, having access to devices in the Front area 84 and Back area 86 of the building. The user 79 is a manager and belongs to the Employee 80 and Manager 82 groups, the Manager group 82 having access to the Vault area 88.

Figure 12:
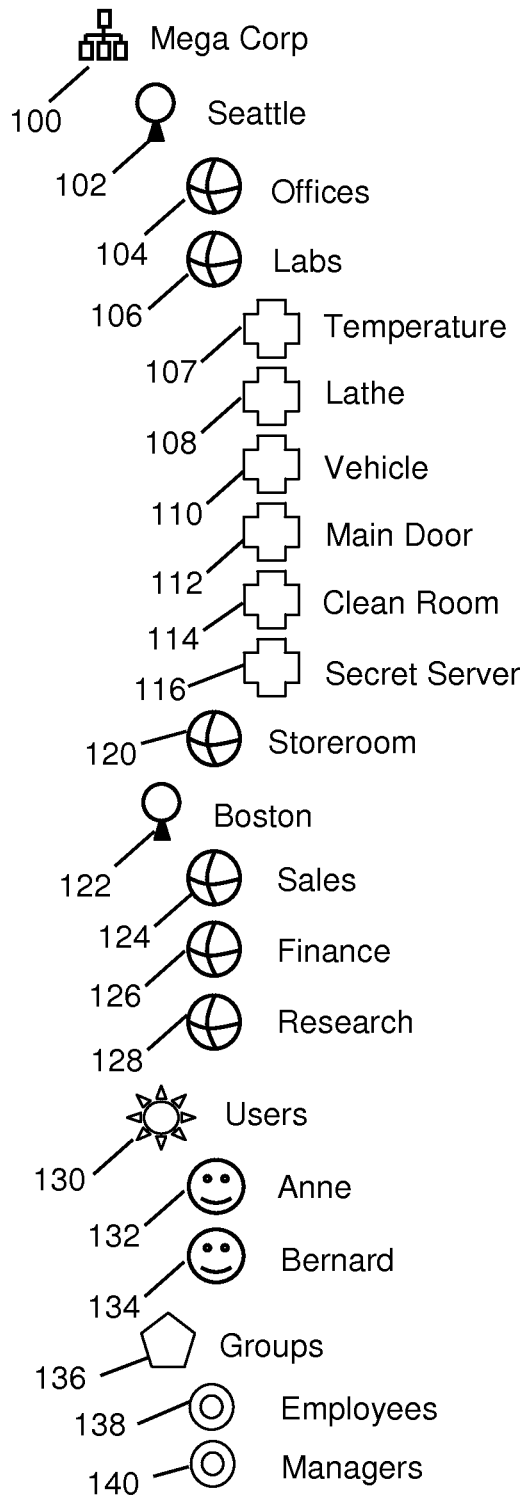
FIG. 12 is a view of objects that have been defined in a unified permissions system.

Referring to FIG. 12, when an administrator logs on using computer 9 (see FIGS. 8 and 9) he may browse to the permissions database 28 which, for example, may result in the display of a hierarchical tree including physical devices connected to the system, the groups and the users. The permissions database 28 may apply to a worldwide corporation or enterprise 100 shown at the forest level with sites in Seattle 102 and Boston 122, for example, at the tree level. Each site may be further broken down into domains (i.e. zones or areas), such as offices 104, labs 106, storeroom 120 or they may be broken down into organizational units such as sales 124, finance 126, research 128, etc. Users may work in the labs 106, for example, and have access to physical devices such as temperature control 107, a lathe 108, a company vehicle 110, access through the main door 112, access to the clean room 114, etc. These domains may, for example, be defined in the Lightweight Directory Service of Microsoft's Active Directory, or in the Active Directory Application Mode. Also included in this list may by access to traditional logical resources such as a top secret server 116. By clicking on an icon 107, 108, 110, 112, 114, 116 representing an object, or the name of the object, a control interface for the object may be displayed on the administrator's computer terminal 9, which may allow the administrator to change the attributes of the object.

Users 130 may also appear in the list, such as Anne 132 and Bernard 134. Groups 136 that have been defined may also appear, such as employees 138, managers 140, etc. The use of groups is preferred to organizational units, as a user may be a member of more than one group, which allows for greater flexibility when assigning permissions to physical devices. However, organizational units may still be used if embodiments are desired where a user can only be a member of one organizational unit, or department.

The list of objects may be shown as a traditional tree structure, and the objects, or links to them may be stored in any hierarchy desired by the administrator. As with files displayed in file browsers, details or attributes of each object such as type, size, date of creation, etc may optionally be displayed alongside each object. The way the list is displayed may be independent of the way the permissions for each user are stored.

Referring again to FIG. 12, for example, when a user logs on using computer 9 he may browse to the permissions database 28 which will result in the display of a hierarchical tree of physical devices to which the user has permission. In this case, only objects to which the user has permission will be displayed, such as items 100-128. Alternatively, all may be displayed, but the inaccessible ones may be grayed out. By clicking on an icon 107, 108, 110, 112, 114, 116 representing an object, or the name of the object, a control interface for the object may be displayed on the user's computer terminal 9, or if it is an entry device, for example, it may be sent an instruction to operate. For example, a door lock device may be instructed to open.

Figure 13:
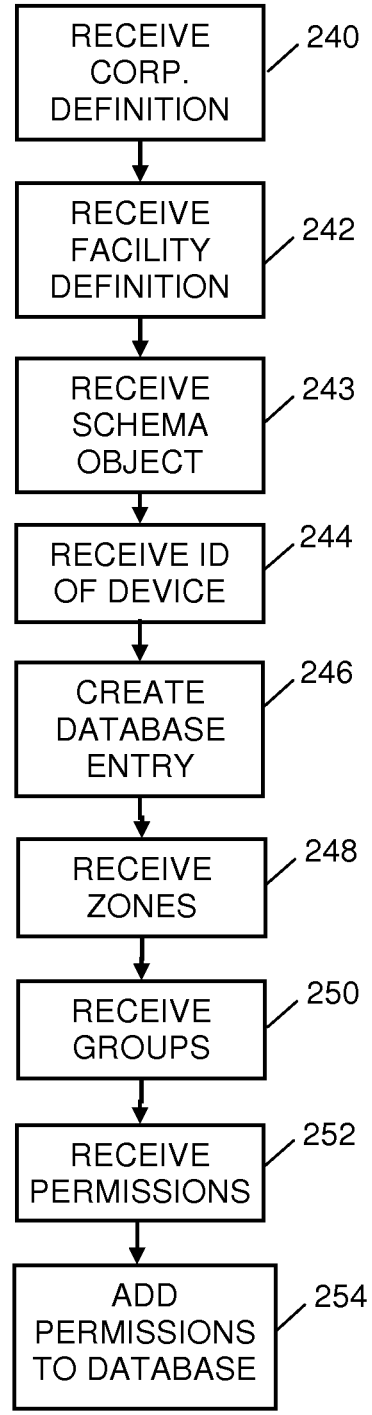
FIG. 13 is a flowchart for setting up a unified permissions system.

Referring to FIG. 13, a flowchart is shown that indicates how the unified permissions system may be set up. For example, a corporation may be defined 240 by an administrator accessing the CMC through a PC and entering a name and optionally a description and identification number. Similarly, the system may receive 242 one or more facility definitions, for facilities within the corporation. Such definitions may be possible using default objects and attributes that are already defined in a schema for the database. Each facility may further be divided into domains, rooms, functions etc. Physical devices will need schema objects creating, for each new type or class of physical object. The system may receive 243 such new schema objects from an administrator. For example, an schema class added to the system may be a zone or area for which access permissions are to be granted. Other examples of schema classes may be an access group, card, a schedule or a device, etc. Schema attributes may be user ID, schedule ID, schedule hours, device type, card data, etc.

The administrator may then provide 244 identification of each physical device that is attached to the system. Identification is achieved by completing the available fields that have been previously been defined within the unified schema for the objects, which may be physical or logical assets. The system creates 246 a database entry for each physical device connected to the system. The administrator enters 248 the areas or zones to which the devices are associated, then defines and enters 250 the groups of users. Once the groups are defined, the administrator then provides permissions to the system, which receives 252 them and adds 254 them to the permissions database.

Figure 14:
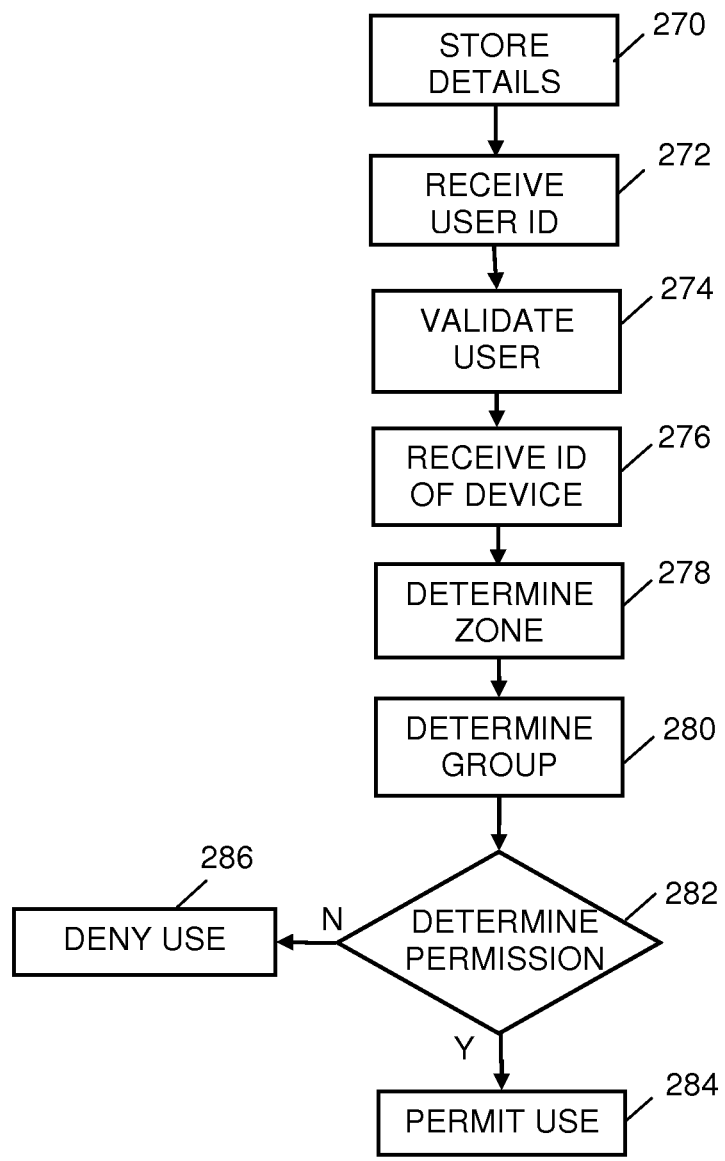
FIG. 14 is a flowchart for permitting user access to a physical device.

FIG. 14 is a flowchart showing how a user may be permitted access to a physical device. In step 270, the permissions database is set up by storing details of users, physical devices, zones in which physical devices are located, groups to which users belong, and permission of groups to zones. The system then receives 272 an identification of a user wishing to use or have access to a physical device or through a portal controlled by a physical device. The system validates 274 the user, which may include validating the identity provided or validating both the identity and a password also provided. In step 276, the system receives identification of the device the user wishes to use. The zone in which the device is located is then determined 278, and the group to which the user belongs is also determined 280. Next, at step 282, the system determines whether the determined group has permission to access the determined zone. If permission has been granted, the system permits 284 use of the device. If permission has not been granted, the user is denied 286 use of the device.

Visitor Management

The permissions system may be used for visitor management. Each visitor may be recorded as an object in the permissions database, which will also store the permissions that have been granted to the visitors for accessing the physical devices in the premises. The physical device for which permission is granted may, for example, be the main entrance and the exit doors. The visitor may be given an identifiable fob or key card that can be used at door access readers. The fob or key card itself may be recorded as an object in the permissions database, and permissions may be granted to the fob or key card. Times and days for which access to the physical objects is granted may also be stored in the permissions database. In other embodiments, a visitor may be given a username and password, which may be used for accessing computers, files, machinery, building controls etc.

By using a central permissions database, a given visitor that visits multiple sites of the same company may be more easily be managed. Likewise, employees at one site of a company may more easily be managed when visiting other sites of the same company.

As will be apparent to those skilled in the art, and in light of the foregoing disclosure, many further alterations and modifications are possible in the practice of this invention without departing from the scope thereof. The steps of the process described herein may be performed in a different order to that shown, they may be performed differently, or some may be omitted while still achieving the same objective. Accordingly, the scope of the invention is to be construed in accordance with the substance defined by the following claims:

The invention claimed is:

1. A system for managing permissions comprising:
   one or more first physical devices in one or more first buildings, each requiring users thereof to be granted permission before use thereof;
   one or more second physical devices in one or more second buildings, each requiring users thereof to be granted permission before use thereof;
   a network to which each of the first and second physical devices is operably connected;
   a computer connected to the network;
   a central database accessible by said computer, said database storing:
      identifications of users correlated with identifications of first and second physical devices to which the users have been granted permission;
      identifications of logical assets on the network to which the users have been granted permission;
      records of groups, each group comprising one or more of the users;
      records of zones, each zone comprising one or more of the physical devices; and
      permissions of groups to zones;
      wherein said groups and zones correlate identifications of users with identifications of physical devices to which the users have been granted permission; and
   a first further computer located in one of the first buildings, connected to the network and to a first partial cache of the central database; and
   a second further computer located in one of the second buildings, connected to the network and to a second partial cache of the central database;
   wherein, when identification of a user is presented to a first physical device, use thereof is permitted if the first further computer determines by accessing the first partial cache that permission has been granted for said user to use said first physical device;
   wherein, when identification of another user is presented to a second physical device, use thereof is permitted if the second further computer determines by accessing the second partial cache that permission has been granted for said other user to use said second physical device;
   wherein the first further computer permits access by said user to logical assets for which said user has permission; and
   wherein the second further computer permits access by said other user to logical assets for which said other user has permission.

2. The system of claim 1, wherein each first and second physical device has an IP address or is connected to the network via an intermediate device that has an IP address, and communications between the first and second physical devices and the first and second further computers respectively use a TCP/IP protocol.

3. The system of claim 1 wherein the physical devices are selected from a group comprised of: door entry devices, intrusion devices; alarm keypads; burglar alarms, fire alarms, IP fire alarms, card readers, RFID entry devices, biometric entry devices, intercoms, IP voice devices; CCTV cameras; combination devices; IP camera-intercom systems; IP camera-microphone-keypad-reader systems; HVAC devices; building management devices, lights, daylight sensors, light level sensors, temperature sensors, heating appliances, air conditioning systems, humidity detectors, automated blind controls, occupancy sensors; smoke sensors; IP programmable logic controllers, nurse call devices, SCADA devices; batch systems; managed devices with IP addresses; managed devices which may be allocated IP addresses, cars, forklift trucks, buses, cranes, diggers, workshop machinery, laboratory equipment, furnaces, production lines, public announcement systems, showers, microwaves, electric bikes, vehicles, machines, equipment, devices connected wirelessly to the network and mass notification systems.

4. The system of claim 1 wherein the logical assets are selected from a group comprised of: computers, files, electronic data, electronic storage components, optical storage devices, printers, scanners, networked fax machines, software application programs and websites.

5. The system of claim 1 wherein each of the first and second further computers permit access by both said user and said other user to logical assets for which they have permission.

6. The system of claim 1 wherein the central database further stores:
   records of groups, each group comprising one or more of the users;
   records of zones, each zone comprising one or more of the first physical devices or one or more of the second physical devices; and
   permissions of groups to zones;
thereby correlating identifications of users with identifications of first and second physical devices to which the users have been granted permission.

7. A system for managing permissions comprising:
   one or more physical devices each requiring users thereof to be granted permission before use thereof;
   a network to which each of the physical devices is operably connected;
   a computer connected to the network;
   a central database accessible by said computer and located in a building different from a further building in which at least some of the physical devices are located, said central database storing:
      identifications of users correlated with identifications of physical devices to which the users have been granted permission;
      identifications of logical assets to which the users have been granted permission, in correlation with the identifications of users;
      records of groups, each group comprising one or more of the users;
      records of zones, each zone comprising one or more of the physical devices; and
      permissions of groups to zones;
      wherein said groups and zones correlate identifications of users with identifications of physical devices to which the users have been granted permission; and
   in the further building, a partial cache of the central database connected to the network and a further computer connected to the cache;
   wherein when identification and authentication of one of the users is received at the further computer, from one of said users, use of the physical devices in the further building to which said one user has been granted permission is permitted without said one user providing further authentication;
   and wherein use of the logical assets to which said one user has been granted permission is permitted by said further computer without said one user providing further authentication.

8. The system of claim 7, further comprising a PKI server connected to the network, the PKI server configured to:
   receive said identification of said user;
   receive said authentication of said user;
   verify said authentication; and
   if said authentication is verified, transmit said identification and said authentication to the further computer.

9. Non-transitory computer readable media comprising first and second non-transitory computer-readable media located in first and second buildings respectively, said first media configured to store a unified permissions database comprising:
   identifications of users;
   authentications of said users;
   definitions of groups;
   records of said groups to which said users belong;
   identifications of physical devices;
   definitions of zones, each of which comprise one or more said physical devices;
   permissions of certain of said groups to certain of said zones, thereby relating identifications of one or more users with identifications of one or more physical devices to which said users have been granted permission; and
   records of logical assets to which said users have been granted permission;
and said second media configured to store:
   a partial cache of the unified permissions database; and
   a program configured to receive identification and authentication of at least one of said users and to permit use by said one user of physical devices that are in the second building to which said one user has been granted permission;
   wherein use of the logical assets to which said one user has been granted permission is also permitted by said program.

10. A method for permitting use of physical and logical devices, the method comprising the computer-implemented steps of:
   storing, in a first computer readable memory in a first building, a central database comprising details of users; physical devices; zones comprising physical devices; groups comprising users; permissions of groups to zones; and
   permissions of users to logical assets;
   storing, in a second computer readable memory in a second building, a partial cache of the central database;
   receiving, by a processor in the second building, an identification of a user;
   authenticating said user;
   receiving an identification of a physical device in the second building that said user wishes to use;
   determining a zone in which said physical device is located;
   determining a group in which said user is a member;
   determining whether said group has permission for said zone;
   if said group has permission, permitting said user to use said physical device; and permitting said user to use logical assets for which said user has permission.

11. The method of claim 10 further comprising the computer-implemented steps of:
receiving a command from said user; and
transmitting the command to said physical device.

* * * * *